Patented Aug. 17, 1954

2,686,769

UNITED STATES PATENT OFFICE 2,686,769

FLAMEPROOFING AQUEOUS SUSPENSIONS OF HALOMETHYLATED PHOSPHATES

John G. Frick, Jr., and Jeremiah W. Weaver, New Orleans, La., assignors to the United States of America as represented by the Secretary of Agriculture No Drawing. Application October 14, 1952, Serial No. 314,754

11 Claims. (Cl. 260—29.6)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to compositions for flameproofing textiles. More particularly, the invention provides aqueous suspensions of polyhalomethylated polyallyl phosphates, which can be applied to textiles in flameproofing amounts in a single treatment using conventional textile treating apparatuses and procedures.

In application No. 279,203, filed March 28, 1952, aqueous suspensions of polyhalomethylated polyallyl phosphates and methods of preparing and using the suspensions are described. According to the process of that application at least one polymerizable, neutral unsaturated alcohol ester of phosphoric acid, at least one bromo or chloro polyhalomethane, a catalytic amount of a water soluble peroxidic polymerization catalyst, are emulsified with sufficient water and emulsifying agent to form a relatively fluid emulsion which is stable when agitated at the reaction temperature; and the emulsion is agitated at a temperature at which the catalyst forms free radicals until the emulsion becomes a suspension containing a dispersed solid polyhalomethylated polyallyl phosphate.

The method of that application is satisfactory and efficient. However, a plurality of impregnation steps are generally required to flameproof a textile. In addition, the suspensions so produced are acidic and are preferably neutralized by the addition of a water soluble base prior to their application to a textile.

According to the present invention an alkali metal bicarbonate is incorporated into the emulsified reagents, prior to reacting them in the amount of from about 5 to 8 percent of the weight of polyhalomethane and triallyl phosphate. The use of from about 5 to 6 percent of sodium bicarbonate is preferred.

Unobviously the reaction in the presence of the bicarbonate appears to produce a suspension of the same solid polymer; although, in the formation of the polymer, polyhalomethyl groups are added via a free radical mechanism, and in general, the cleaving out of halogen from polyhalo groups tends to occur to a much greater extent in a neutral or basic medium. Unobviously the reaction in the presence of the bicarbonate produces an appreciably more concentrated suspension of the solid polymer, and these suspensions, without concentration, flameproof cotton textiles when applied in a single impregnating step using a conventional textile impregnating apparatus and procedure.

According to this invention, textiles are flameproofed by impregnating them with an amount of the improved aqueous suspensions causing a 25 to 30% increase in the weight of the textile, and evaporating the volatile components of the suspension, preferably by heating the impregnated material at from about 100 to 140° C. for from about 5 to 30 minutes, with the longer times being used with the lower temperatures. In general such a heating markedly decreases the tendency of the flameproofing agent to be removed by launderings and the like.

Substantially any polymerizable neutral unsaturated alcohol ester of phosphoric acid can suitably be used in the processes provided by the present invention. A preferred class of such esters consists of trialkenyl phosphates in which three terminally unsaturated allylic radicals are attached to each phosphate radical, i. e., esters such as triallyl, trimethallyl, or triethallyl, and the like phosphates, or diallyl, methallyl, ethallyl dimethallyl, methyl divinyl, and the like mixed phosphates. Triallyl phosphate is typical of such phosphates, and is an ester which is particularly suitable for employment in the present processes.

The polyhalomethanes suitable for employment in the present process are derivatives of methane in which at least two hydrogen atoms are replaced by atoms of chlorine or bromine and may be represented by the formula $CX_2Y_2$ wherein X is chlorine or bromine and Y is hydrogen, chlorine, or bromine. This class of compounds includes compounds of the formula, $CBr_4$, $CBr_3Cl$, $CBr_2Cl_2$, $CBrCl_3$, $CBr_3H$, $CBr_2H_2$, $CCl_4$, $CCl_3H$, and $CCl_2H_2$. Such polyhalomethanes having a molecular weight above 150 have been found to be particularly suitable for employment in the processes of the present invention. Bromine-containing "perhalomethanes" (those in which all of the hydrogen have been replaced by halogen atoms) in which the halogen atoms are chlorine or bromine atoms, i. e., $CBr_4$, $CBr_3Cl$, $CBr_2Cl_2$, and $CBrCl_3$, are especially suitable.

For simplicity of language, the esters of phosphoric acid which can suitably be used in the processes of the invention will hereinafter be referred to by the term, "phosphate," and the polyhalomethanes which can suitably be used will be referred to by the term "halomethane." Substantially any water soluble peroxidic polymerization catalyst which forms free radicals at a relatively rapid controllable rate of temperatures below about 200° C. can suitably be used in the production of the aqueous suspensions provided by the present invention. Such catalysts include $H_2O_2$, the water soluble persulfates, the water soluble organic hydroperoxide salts, the water soluble organic peracids, and the like peroxidic catalysts. The sodium, potassium and ammonium persulfates are particularly suitable.

Substantially any of the conventional emulsifying agents can suitably be used in the present process. As is known to those skilled in the art, emulsifying agents vary widely in cost as well as in the amount of agent required to emulsify a given mixture of immiscible liquids. Since, in order to obtain a rapid reaction, a reaction medium should be as uniform, as concentrated, and as non-viscous as is possible, the choice of a particular emulsifying agent will depend upon its capacity to produce uniform emulsions when used in quantities not unduly raising the viscosity of the emulsion balanced against the cost of the emulsifying agent and the cost of a slower or less efficient reaction. Suitable emulsifying agents include the polyvinyl alcohols, the sulfated alcohols, dioctyl sodium sulfosuccinate, isopropyl naphthalene sodium sulfonates, ammonium oleate, carboxymethylcellulose, the resin soaps, and the like emulsifying agents. The polyvinyl alcohols of medium viscosity are particularly suitable.

The reaction time necessary to produce the aqueous suspensions provided by this invention, in each particular case, depends upon the phosphate, the halomethane, and the catalyst used, as well as upon the concentration and proportions of the reactants in the aqueous emulsion constituting the reaction mixture. When the nonaqueous phase of the reaction mixture contains a dispersed polymer containing phosphorus and halogen, the reaction can suitably be terminated. The suitability of the use of longer reaction times is dependent upon the economics of the cost introduced by the additional time and energy spent in using up more of the reactants.

The process of this invention can be conducted in a batchwise or continuous manner. The reaction can suitably be conducted at atmospheric pressure or under superatmospheric pressure.

The proportions of the phosphate and the halomethane reactants can suitably be varied widely. It has been demonstrated that solid phosphorus and halogen containing compositions produced by the process of this invention containing widely varying proportions of phosphorous and halogen are capable of reducing the combustibility of combustible organic materials. In general, the use of from about $\frac{1}{3}$ to $\frac{2}{3}$ mole of the halomethane reactant per mole of the phosphate reactant is preferred.

The proportions of the peroxidic polymerization catalyst can also be varied widely, and the results of using large or small amounts, based on the weight of the polymerizable reactant, are analogous to those generally obtained in emulsion polymerization reactions. The employment of from about 0.01 to 0.03 mole of catalyst per mole of phosphate reactant is preferred.

The proportion of organic reactants and the proportion of emulsifying agent in the aqueous emulsion constituting the reaction mixture can also be varied widely. It is of course advantageous to use as little of the emulsifying agent and water as can be used in producing a relatively fluid emulsion in which the reactants are uniformly mixed. The use of about 1 part of a medium viscosity polyvinyl alcohol in alcohol in about 100 parts of water emulsified with about 50 parts of organic reactants has been found to be particularly suitable.

The following examples are illustrative of the invention:

Example I

A mixture of 252 g. triallyl phosphate, 163 g. bromoform., 12.5 g. potassium persulfate, 85 g. polyvinyl alcohol (medium viscosity), 22.5 g. sodium bicarbonate and 850 ml. water was mechanically stirred until completely emulsified. The mixture was then warmed at 85–90° C. for 2.5 hours with continuous stirring. The emulsion, as produced, was ready for use.

A cotton cloth was dipped in the emulsion, passed through padding rolls to remove the excess, and dried. Padding cloth to a wet pick-up of 85–90% produced treated cloths having a dry pick-up of from 25–27%. Curing the so treated cloths for 8 minutes at 140° C. or for from 20 to 30 minutes at 120° C. produced flameproof cloths which exhibited little if any loss of flameproofness after 6 launderings.

Example II

A mixture of 218 g. triallyl phosphate, 332 g. of carbon tetrabromide, 16.5 g. of potassium persulfate, 110 g. polyvinyl alcohol (medium viscosity), 30 g. sodium bicarbonate, and 1100 ml. of water was mechanically stirred until completely emulsified. The mixture was then warmed at 85–90° C. for 25 hours with continuous stirring. The emulsion, as produced, was ready for use.

We claim:

1. A process of preparing a flameproofing composition comprising subjecting an aqueous emulsion containing (1) a methane derivative of the formula $CX_2Y_2$ wherein X is a member selected from the group consisting of chlorine and bromine and Y is a member selected from the group consisting of hydrogen, chlorine and bromine, (2) a polymerizable, neutral, unsaturated alcohol ester of phosphoric acid, (3) an alkali metal bicarbonate in an amount of about from 5 to 8% of the weight of the said methane derivative and the said phosphoric acid ester, and (4) a water-soluble peroxidic polymerization catalyst as the sole catalyst, to heating at a temperature below about 200° C. at which the catalyst forms free radicals and until the emulsion becomes an aqueous suspension in which the nonaqueous phase contains a dispersed polymer having phosphate and halomethyl groups.

2. The process of claim 1 wherein the ester of phosphoric acid is a trialkenyl phosphate in which three terminally unsaturated allylic radicals are attached to each phosphate radical.

3. The process of claim 1 wherein the ester of phosphoric acid is triallyl phosphate.

4. The process of claim 1 wherein the methane derivative is bromoform.

5. The process of claim 1 wherein the methane derivative is carbon tetrabromide.

6. The process of claim 1 wherein the methane derivative is dibromodichloromethane.

7. The process of claim 1 wherein the methane derivative is bromotrichloromethane.

8. The process of claim 1 wherein the catalyst is potassium persulfate.

9. The process of claim 1 wherein the alkali metal bicarbonate is sodium bicarbonate.

10. The process of claim 1 wherein the ester of phosphoric acid is triallyl phosphate, the methane derivative is bromoform, the catalyst is potassium persulfate, and the alkali metal bicarbonate is sodium bicarbonate.

11. The process of claim 1 wherein the methane derivative and ester of phosphoric acid are used in the proportions of about from 1/3 to 2/3 moles of the methane derivative per mole of the phosphoric acid ester.

References Cited in the file of this patent

UNITED STATES PATENTS

| Number | Name | Date |
| --- | --- | --- |
| 2,547,701 | Gregg | Apr. 3, 1951 |
| 2,574,515 | Walter et al. | Nov. 13, 1951 |
| 2,660,543 | Walter et al. | Nov. 24, 1953 |